United States Patent [19]
Conn

[11] 4,442,668
[45] Apr. 17, 1984

[54] GAS TURBINE ENGINE FUEL CONTROL SYSTEM

[75] Inventor: Francis E. Conn, Plainfield, Ind.

[73] Assignee: General Motors Corporation, Detroit, Mich.

[21] Appl. No.: 362,494

[22] Filed: Mar. 26, 1982

[51] Int. Cl.³ .............................................. F02C 9/28
[52] U.S. Cl. .................................................. 60/39.281
[58] Field of Search ............................ 60/39.281, 243

[56] References Cited

U.S. PATENT DOCUMENTS

| | | | |
|---|---|---|---|
| 2,947,142 | 8/1960 | Nugent | 60/39.281 |
| 3,332,233 | 7/1967 | McQueen | 60/39.281 |
| 3,664,124 | 5/1972 | Fehler | 60/39.281 |
| 4,033,116 | 7/1977 | Dmitriev et al. | 60/39.281 |

Primary Examiner—Louis J. Casaregola
Attorney, Agent, or Firm—Saul Schwartz

[57] ABSTRACT

An improved fuel control system for a turboshaft gas turbine engine wherein fuel is metered in proportion to the magnitude of a control pressure and a governor operates in a first mode to regulate compressor discharge pressure down to the control pressure and in a second mode causes the control pressure to increase toward compressor discharge pressure at a relatively rapid rate, the improvement residing in the provision of a valve and an accumulator which operate during the second governor mode to retard the rate of increase of the control pressure toward compressor discharge pressure so that compressor instability is avoided even if the engine is accelerated before internal temperature stability is achieved.

5 Claims, 3 Drawing Figures

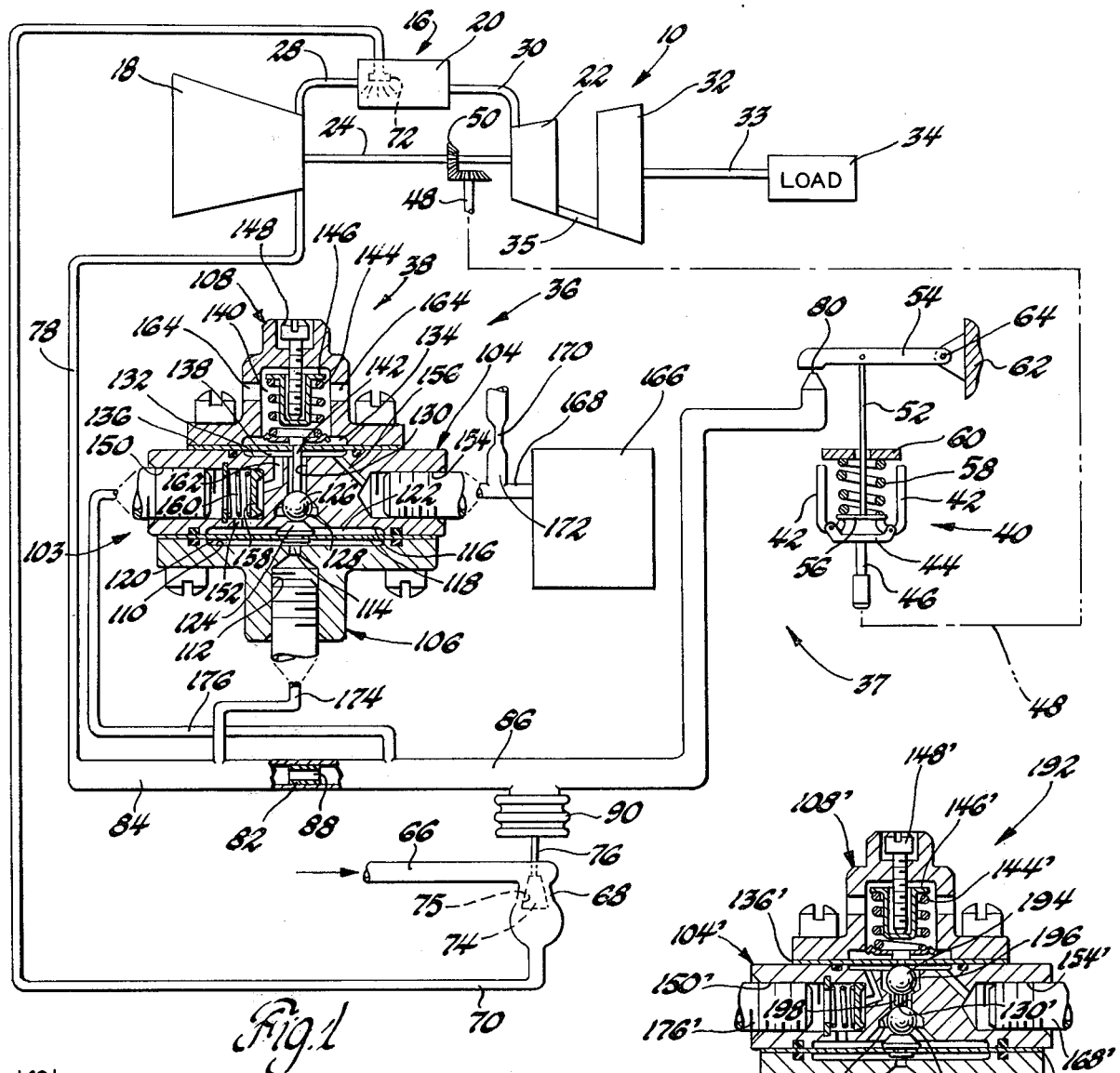
Fig. 1
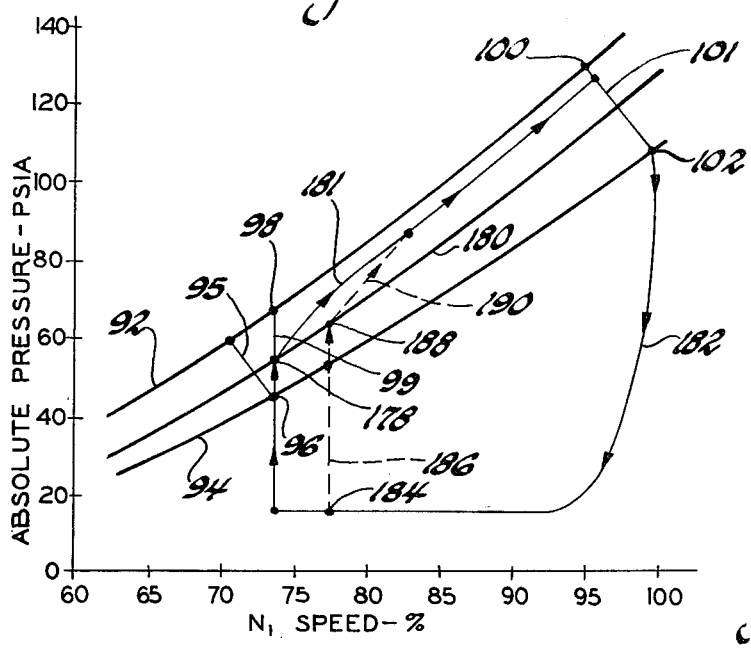
Fig. 2
Fig. 3

GAS TURBINE ENGINE FUEL CONTROL SYSTEM

BACKGROUND OF THE INVENTION

1. Field of Invention

This invention relates generally to fuel control systems for gas turbine engines and, more particularly, to an improvement in such fuel control systems whereby compressor instability is avoided under particular engine operating conditions.

2. Description of the Prior Art

Ideally, a turboshaft gas turbine engine fuel control system schedules fuel flow to the engine's combustor at rates compatible with the power demanded from the engine and with avoidance of compressor instability conditions known as surge or stall. Typical fuel controls achieve this goal for steady state engine operation and for transient cycles of acceleration and deceleration where the cycles are sufficiently separated in time to allow the internal components of the engine to achieve temperature stability. Where time separation between cycles is insufficient for temperature stabilization, the normal fuel schedule might encroach on a region of compressor instability temporarily shifted by the unstabilized temperature conditions within the engine. To avoid such encroachment, expensive and complex systems have been proposed to bleed air from the compressor before the onset of compressor instability. Alternatively, a fuel control system has been proposed which incorporates a time delay mechanism operative to maintain a leaner than normal fuel/air ratio for a preselected duration after the engine reaches idle speed regardless of subsequent power demand. A gas turbine engine fuel control system according to this invention represents an improvement over these and other known systems.

SUMMARY OF THE INVENTION

The primary feature, then, of this invention is that it provides a new and improved gas turbine engine fuel control system wherein compressor instability is simply, efficiently, and economically avoided during repeated, closely spaced cycles of acceleration and deceleration. Another feature of this invention is that it provides a new and improved gas turbine engine fuel control system of the type wherein fuel flow is proportional to a control pressure the magnitude of which depends upon compressor discharge pressure and engine speed and wherein compressor instability is avoided through retardation of the rate of increase of the control pressure and consequent retardation of the rate of increase of fuel flow. Still another feature of this invention resides in the provision in the new and improved gas turbine engine fuel control system of a valve assembly operative during engine acceleration to maintain a regulated difference between a higher compressor discharge pressure and a lower control pressure and in the provision of feedback means operative during operation of the valve assembly to reduce the regulated pressure difference at a predetermined rate so that the control pressure and corresponding fuel flow rate increase at rates sufficiently retarded to avoid the onset of compressor instability. A still further feature of this invention resides in the provision in the new and improved gas turbine engine fuel control system of feedback means including an accumulator for controlling the rate at which the regulated pressure difference decreases, a diaphragm exposed to accumulator pressure and connected to the valve assembly to effect the reduction in regulator pressure difference, and a fixed orifice operative to exhaust the accumulator.

These and other features of this invention will be readily apparent from the following specification and from the drawings wherein:

FIG. 1 is a simplified schematic illustration of a turboshaft gas turbine engine and an improved gas turbine engine fuel control system according to this invention;

FIG. 2 is a plot on coordinate axes representing absolute pressure (ordinate) and gasifier speed (abscissa) illustrating the operation of the improved fuel control system according to this invention; and FIG. 3 is a view of a portion of FIG. 1 showing a modified valve assembly.

Referring now to FIG. 1 of the drawings, a conventional turboshaft gas turbine engine 10 is illustrated in highly simplified and schematic fashion. The engine 10 is intended to be representative, generally, of commercially available gas turbine engines such as the Model 250 helicopter engine manufactured by Detroit Diesel Allison Division, General Motors Corporation, Indianapolis, Ind., wherein engine power output is controlled by control of the speed of the gas producer or gasifier section of the engine. More particularly, the gas turbine engine 10 includes a gasifier or gas producer section 16 consisting of a compressor 18 of the axial or radial flow type, a combustor 20, a gasifier turbine 22, and a shaft 24 interconnecting the turbine 22 and the compressor 18. In conventional fashion the compressor 18 supplies compressed air to the combustor 20 through a conduit 28 while products of combustion developed in the combustor 20 are conveyed to the gasifier turbine 22 through a conduit 30 whereby the gasifier 16 is driven or rotated at gasifier speed, abbreviated hereinafter as $N_1$. The engine 10 further includes a power turbine 32 connected by a shaft 33 to a load 34 to be driven by the engine. The power turbine 32 is driven by products of combustion exhausted from the gasifier turbine 22 and directed to the power turbine through a conduit 35.

Referring again to FIG. 1, a highly simplified and schematically illustrated fuel control system according to this invention and designated generally 36 is provided in combination with the engine 10 and includes a conventional fuel scheduling portion 37 and a compressor instability control portion 38. The fuel scheduling portion 37 is representative generally of pneumatic type fuel controls such as Bendix DP Series pneumatic fuel controls manufactured by Bendix Energy Controls Division, Bendix Corporation, South Bend, Ind., wherein the fuel flow rate to the combustor is proportional to the magnitude of a pneumatic control pressure. In its salient features, the scheduling portion 37 includes a governor 40 having a pair of governor weights 42 pivotally supported on a rotatable platform 44 rigidly connected to a shaft 46. The shaft 46 is connected by a schematically illustrated intermediate shaft means 48 to a gear set 50 at the gasifier shaft 24 so that the rotational speed of the platform 44 and weights 42 is always directly proportional to $N_1$. The governor 40 further includes a control rod 52 connected at one end to a valve closure member or flapper 54 and at the other end to a retainer 56. A spring 58 is interposed between the retainer 56 and a movable spring seat 60. In well known fashion, the governor weights 42 bear against the side of retainer 56 opposite the spring 58 so that as $N_1$ increases the weights centrifugally expand and lift the control rod 52 upward against the resistance of spring 58. Similarly, as $N_1$ decreases the spring 58 urges the retainer 56 and control rod 52 downward, causing the weights 42 to contract or collapse. The flapper 54 is supported on a fixed structural member, illustrated schematically at 62, for pivotal movement about an axis 64 in response to vertical movement of the control rod 52.

With continued reference to FIG. 1, the fuel scheduling portion 37 further includes a fuel supply line 66 to which fuel is delivered at substantially constant pressure by conventional pump and regulator means, not shown. The fuel supply line 66 is connected through a schematically illustrated conical valve seat 68 to a conduit 70 operative to deliver fuel to a nozzle 72 in the combustor 20. A frustoconical valve member 74 is disposed adjacent the valve seat 68 and cooperates therewith in defining a generally annular orifice 75 through which fuel flows from the supply line 66 to the conduit 70, the valve member being movable vertically by a rod 76 to vary the flow area of the annular orifice 75.

A conduit 78 has a first end connected to the compressor 18 and a second end adjacent the flapper 54 defining a port 80. A barrier 82 divides the conduit 78 into a compressor discharge pressure, abbreviated hereinafter as CDP, chamber 84 between the barrier and the compressor 18 and a control pressure, abbreviated hereinafter as Py, chamber 86 between the barrier and port 80. An orifice 88 through the barrier 82 interconnects the CDP chamber 84 and the Py chamber 86. An expanding bellows 90 is exposed to the pressure in Py chamber 86 and is connected to rod 76 so that as the pressure in Py chamber 86 increases the bellows 90 expands causing the rod 76 and attached valve member 74 to move vertically down thereby increasing the size of annular orifice 75 and the fuel flow rate. Conversely, as pressure in Py chamber 86 decreases, the bellows 90 contracts to reduce the size of orifice 75 and fuel flow rate. Accordingly, the rate of fuel flow to the combustor is proportional to the pressure in Py chamber 86.

Referring particularly to FIGS. 1 and 2 and briefly describing the operation of the fuel scheduling portion 37, on a plot, FIG. 2, where the abscissa scale is $N_1$ measured as a percent of maximum $N_1$ and the ordinate scale is absolute pressure in pounds per square inch absolute, a curve 92 illustrates a typical relationship between $N_1$ and CDP and a curve 94 illustrates a typical relationship between Py and $N_1$ for engine 10. In an engine starting sequence with the engine initially at rest, a manual control, not shown, is moved to an idle speed setting and mechanical means are activated to rotate gasifier 16. When the control is set at idle, the flapper 54 closes port 80 so that initially as $N_1$ increases Py equals CDP and both increase along an extension of curve 92, not shown, corresponding to low gasifier speed. As CDP and Py increase, orifice 75 opens, fuel flows to combustor 20, and the engine becomes self sustaining with CDP and Py rapidly increasing with $N_1$ along curve 92. As gasifier idle speed approaches, the weights 42 begin expanding and Py, the control pressure, begins to decrease along an ideal governor curve 95 until, at idle speed, the governor, operating in a first or normal governing mode, maintains Py at a value corresponding to a point 96 on curve 94 with CDP at a value corresponding to a point 98 on curve 92, and enough fuel flowing through orifice 75 to maintain the gasifier at idle speed.

When full engine power is desired and assuming for simplicity that compressor instability control portion 38 is inoperative, the manual control is moved to a full power position causing the governor 40 to operate in a second or acceleration mode wherein spring seat 60 compresses spring 58 which, in turn, collapses the governor weights 42 and brings the flapper 54 down to effectively close port 80 so that Py in Py chamber 86 increases substantially to CDP along a line 99 between points 96 and 98. Simultaneously, annular orifice 75 expands as bellows 90 expands causing increased fuel flow to the combustor and corresponding acceleration of the gasifier section 16. As curve 92 illustrates, CDP, which equals Py as long as port 80 is closed, increases with gasifier speed until a point 100 is reached whereat the governor weights 42 begin expanding and lifting flapper 54 to open port 80 so that Py decreases relative to CDP along an ideal governor curve 101 between point 100 and a point 102 on curve 94 corresponding to 100% gasifier speed.

Referring again to FIG. 1 and describing the instability control portion 38, the latter includes a valve 103 having a housing 104, a lower cover 106, and an upper cover 108. A generally circular depression 110 in the lower cover 106 is connected to a port 112 through a passage 114 and registers with a generally equally sized circular depression 116 in the facing surface of the housing 104. A metal diaphragm 118 is clamped between the lower cover 106 and the housing 104 and cooperates with depression 110 in defining a first chamber 120 and with the depression 116 in defining a second chamber 122. A ball retainer 124 attached to the diaphragm 118 contacts a check ball 126 which, in turn, rests against a seat 128 formed in the housing 104. The ball closes one end of a bore 130 in the housing which otherwise communicates with second chamber 122.

Another circular depression 132 in the housing 104 registers with a cavity 134 in the upper cover 108 and communicates with the end of bore 130 opposite the check ball 126. A second metal diaphragm 136 is clamped between the upper cover 108 and the housing 104 and cooperates with the depression 132 in defining a third chamber 138. In addition, the diaphragm 136 also cooperates with the cavity 134 in defining a fourth chamber 140. A pin 142 is rigidly attached to the metal diaphragm 136 and projects with substantial clearance through bore 130 and is engageable on the check ball 126 to unseat the latter as described hereinafter. A spring 144 in chamber 140 seats at one end against the metal diaphragm 136 and at the other end against a spring seat 146 adjustable by a screw 148 mounted on the upper cover 108.

A port 150 in the housing 104 is connected to the second chamber 122 through a slot or hole 152 and an accumulator port 154 in the housing 104 is connected to the third chamber 138 through a passage 156. A check valve member 158 is mounted at an inboard or closed end of port 150 and is urged by a spring 160 into a position sealing the end of a passage 162 extending from the port 150 to the third chamber 138. In an open position of the check valve member 158, not shown, communication is permitted between the third chamber 138 and the port 150. The fourth chamber 140 is vented to atmospheric pressure through a plurality of vents 164 in the upper cover 108.

The instability control portion 38 further includes an accumulator 166 connected to accumulator port 154 through a conduit 168. An orifice 170 in a branch 172 from the conduit 168 is exposed on one side to pressure in accumulator 166 and on the other side to atmospheric pressure. A conduit 174 connected between CDP chamber 84 and the port 112 conveys compressed air at CDP to the port 112 and through the passage 114 into the first chamber 120. Finally, a conduit 176 connected to the Py chamber 86 and to the port 150 conveys air at Py to the port 150 and through slot 152 into the second chamber 122. The passage 156 between the accumulator port 154 and the third chamber 138 functions to communicate accumulator pressure to the third chamber.

With respect, now, to the operation of the complete fuel control system 36, to effect engine start-up the manual control, not shown, is moved to a position corresponding to engine idle and gasifier 16 is rotated mechanically. At the idle setting of the control, spring seat 60 causes spring 58 to collapse weights 42 thereby bringing flapper 54 down onto port 80 while rotation of gasifier 16 causes gradual build-up of CDP above atmospheric. Spring 144, however, is sufficiently strong to unseat check ball 126 so that Py chamber 86 exhausts to atmosphere through orifice 170, conduits 172 and 168, port 154, passage 156, third chamber 138, bore 130, second chamber 122, slot 152, and port 150. With Py at atmospheric pressure, valve 74 closes orifice 75 and prevents fuel flow to combustor 20. Thus, to initiate fuel flow, orifice 170 must be temporarily covered to allow Py to increase above atmospheric. Once fuel begins flowing, ignition occurs in the combustor 20 causing gasifier 16 to begin accelerating toward idle speed and both CDP and Py to begin rising toward points 98 and 96 on curves 92 and 94, respectively, as described. At an intermediate value of CDP between atmospheric and point 98, diaphragm 118, under the influence of CDP in chamber 120, overcomes the forces of spring 144 and Py in second chamber 122 and seats check ball 126 on seat 128. At this point the orifice 170 is uncovered since check ball 126 blocks communication between Py chamber 86 and atmosphere. Generally contemporaneously with seating of check ball 126, the engine becomes self sustaining and gasifier 16 accelerates to idle whereupon scheduling portion 37, including governor 40 operating in the first mode, maintains Py and CDP at levels corresponding to points 96 and 98 on curves 94 and 92, respectively, as described hereinbefore.

Considering, now, the situation where the manual control is very quickly moved from idle to a higher power setting, as might occur as part of a quick sequence of control movements between idle and full power or vice versa, the governor 40 operates in the second or acceleration mode wherein spring 58 immediately brings flapper 54 onto port 80 to close the latter so that control pressure Py increases rapidly along line 99 toward CDP at point 98. Increasing Py is transmitted to the second chamber 122 through the conduit 176, the port 150 and the slot 152 and simultaneously builds in the second chamber. When Py achieves a magnitude corresponding to a point 178, FIG. 2, where the difference between CDP and Py corresponds to the force exerted by spring 144, i.e. the maximum regulated pressure difference, check ball 126 unseats and Py exhausts through bore 130, chamber 138, passage 156, port 154 and conduit 168 into accumulator 166. Were Py to exhaust directly to atmosphere, valve 103 would regulate Py constanty at the maximum regulated pressure difference relative to CDP corresponding to the force exerted by spring 144 and Py would increase with increasing $N_1$ along a curve 180 parallel to curve 92, FIG. 2, until reaching ideal governor curve 101 whereupon Py would drop to and be maintained at point 102 as described hereinbefore.

Referring again to FIGS. 1 and 2, it is seen that Py does not exhaust directly to atmosphere. Rather, Py exhausts into accumulator 166, and, at a rate faster than it can escape through orifice 170 so that a feedback pressure develops in the accumulator and in chamber 138 in the valve. The feedback pressure rises at a rate dependent upon the characteristics of the accumulator and the area of orifice 170 and acts in opposition to spring 144 on the lower side of diaphragm 136. The effect of the feedback pressure on diaphragm 136 is to reduce the regulated difference at which valve 103 maintains Py below CDP. Accordingly, Py rises from point 178 toward CDP along a curve 181, FIG. 2, the configuration of which is dictated by the rate at which the feedback pressure increases in accumulator 166. After a predetermined duration, the accumulator 166 becomes fully charged at a maximum feedback pressure which maximum dictates a corresponding minimum regulated pressure difference between Py and CDP and curve 181 becomes parallel to curve 92. In this condition the quantity of air exhausted from the Py chamber 86 just equals the quantity of air escaping from orifice 170. The combination of valve 103 and accumulator 166, then, functions to retard the rate of increase of Py and therefore the corresponding rate of increase of fuel flow to the combustor.

With the flapper 54 maintaining port 80 closed and the gasifier 16 continuing to accelerate, Py increases along the curve 181 until curve 181 intersects ideal governor curve 101 whereupon governor 40 begins to lift flapper 54 from the port 80 so that Py decreases along the governor curve to point 102 whereat the governor reverts to its first operating mode and steady state operation of the engine at 100% rated power is established. As Py decreases due to opening of port 80, the difference between Py and CDP increases so that CDP in chamber 120 acts on diaphragm 118 to reseat check ball 126 on seat 128 and isolate accumulator 166 from Py chamber 86. Thereafter, as the engine operates under steady state conditions the accumulator discharges through conduit 168, branch 172 and orifice 170 to a fully discharged condition.

If the described acceleration sequence is carried out quickly and immediately after the engine has been brought to idle from some higher setting, the retardation of the rate of increase of Py and the corresponding retardation of the rate of increase of fuel flow is sufficient to avoid the onset of compressor instability resulting from unstabilized internal temperatures. In fact, this same retardation occurs whenever Py increases rapidly enough to approach to within the maximum regulated pressure difference dictated by spring 144. If, however, acceleration of the gasifier 16 is satisfactorily accomplished at a rate sufficiently slow to avoid Py approaching to within the maximum regulated pressure difference of CDP, then check ball 126 remains seated and the valve 103 is inoperative. In this situation Py generally traverses a curve which lies between curves 180 and 94.

If, after achieving steady state operation at point 102, the manual control is moved to an idle setting, Py chamber 86 exhausts quickly through port 80 which is opened wide by flapper 54 as weights 42 expand quickly against the reduced resistance of spring 58. Py drops quickly toward atmospheric pressure along a curve 182 from point 102. If the manual control is then returned to the full power position at $N_1$ corresponding to idle and before internal temperature stabilization has occurred, the flapper 54 closes port 80 and Py increases rapidly again along the vertical line 99 through point 96 toward CDP curve 92. However, as soon as Py approaches to within the maximum regulated pressure difference between Py and CDP, point 178, check ball 126 unseats to retard the rate of increase of Py, as described, so that engine operation in the region of compressor instability is once again avoided. Should the demand for maximum power occur at some $N_1$ corresponding to a value higher than engine idle, as for example at point 184, then Py would rapidly increase along a vertical line 186 until the maximum regulated pressure difference between Py and CDP is achieved at a point 188 whereupon the rate of increase of Py is retarded, as described, with Py increasing along a curve 190 which merges with curve 181.

With respect to the function of check valve member 158, the latter is interposed between the accumulator 166 and a region of low pressure to insure rapid discharge of the accumulator after each cycle. More particularly, while it is expected that accumulator 166 will ordinarily have time to completely discharge through orifice 170 after an operational cycle, a situation could arise where the manual control is moved from full power to idle and back to full power again before accumulator 166 completely discharges. Retardation of the rate of increase of Py would not begin, then, until Py achieved a magnitude higher than would be the case if the accumulator were completely discharged. To insure immediate discharge of accumulator 166, one side of check valve member 158 is exposed to accumulator pressure via passage 162 while the other side is exposed to Py. When the manual control is moved to idle to quickly exhaust Py chamber 86, accumulator pressure moves the check valve member 158 against spring 160, whereupon accumulator pressure exhausts around the check valve member through Py chamber 86, to atmosphere. Thus, even if the accumulator 166 has not fully discharged through orifice 170 at the onset of engine deceleration it will automatically fully discharge through valve 103 substantially instantaneously upon the onset of deceleration.

Referring now to FIG. 3 of the drawings, a modified valve 192 corresponding generally to the valve 103 is shown. Modified valve 192 includes a plurality of structural components substantially identical to corresponding components in valve 103 which, accordingly, are identified with corresponding primed reference characters. Valve 192 differs from valve 103 by the addition of a second check ball 194 which replaces pin 142 in valve 103. The second check ball is disposed on a conical valve seat 196 in housing 104' and is urged against the seat by spring 144' which engages the ball through diaphragm 136'. The bore 130' interconnects the two valve seats 196 and 128' and a motion transmitting pin 198 slightly longer than the bore 130' is loosely received in the bore between the check balls.

The modified valve 192 functions in a manner identical to that described with respect to valve 103 except during engine starting. In modified valve 192 the spring 144' biases second check ball 194 against seat 196 when Py and CDP are equal so that when gasifier 16 is rotated to begin the start sequence Py chamber 86 is no longer in communication with atmosphere. Accordingly, Py develops in Py chamber 86 without the necessity of temporarily covering orifice 170. After ignition, when CDP achieves a magnitude sufficient to seat check ball 126' on seat 128', pin 198 operates to lift second check ball 194 off of seat 196 so that during subsequent pressure regulation the second ball 194 and pin 198 form a solid connection between the first ball 126' and the diaphragm 136' thereby transferring the net force of spring 144' and accumulator pressure to the diaphragm 118'.

The embodiments of the invention in which an exclusive property or privilege is claimed are defined as follows:

1. In a gas turbine engine having a compressor delivering air at compressor discharge pressure to a combustor and a fuel control system including fuel valve means operative to meter fuel to said combustor in proportion to the magnitude of a control pressure and governor means connected to said fuel valve means operative in a first mode to regulate a supply of air at said compressor discharge pressure down to said control pressure and in a second mode to cause said control pressure to increase toward said compressor discharge pressure at a plurality of rates, the improvement comprising, valve means connected to said governor means operative independently of said governor means during said second mode to regulate said control pressure at a maximum pressure difference below said compressor discharge pressure, and feedback means connected to said valve means operative during said second mode to reduce said maximum pressure difference at a preselected rate so that said control pressure approaches said compressor discharge pressure at said preselected rate.

2. In a gas turbine engine having a compressor delivering air at compressor discharge pressure to a combustor and a fuel control system including a fuel valve means operative to meter fuel to said combustor in proportion to the magnitude of a control pressure, means defining a control volume connected to said compressor, and governor means connected to said control volume operative in a first mode to regulate air therein from said compressor discharge pressure down to said control pressure and in a second mode to cause said control pressure to increase toward said compressor discharge pressure at a plurality of rates, the improvement comprising, a valve for exhausting said control volume independently of said governor means, a diaphragm connected to said valve and exposed on one side to said compressor discharge pressure and on the other side to said control pressure, bias means exerting a bias force on said diaphragm acting with said control pressure, said diaphragm being connected to said exhaust valve so that during said second mode said exhaust valve regulates said control pressure at a maximum pressure difference below said compressor discharge pressure proportional to the magnitude of said bias force, feedback means operative to exert a feedback force on said bias means in opposition to said bias force, and means operative to increase the magnitude of said feedback force at a predetermined rate so that the net bias force on said diaphragm and said maximum pressure difference decrease at said preselected rate and said control pressure approaches said compressor discharge pressure at said preselected rate.

3. In a gas turbine engine having a compressor delivering air at compressure discharge pressure to a combustor and a fuel control system including a fuel valve means operative to meter fuel to said combustor in proportion to the magnitude of a control pressure, means defining a control volume connected to said compressor, and governor means connected to said control volume operative in a first mode to regulate air therein from said compressor discharge pressure down to said control pressure and in a second mode to cause said control pressure to increase toward said compressor discharge pressure at a plurality of rates, the improvement comprising, a valve for exhausting said control volume independently of said governor means, a first diaphragm connected to said valve and exposed on one side to said compressor discharge pressure and on the other side to said control pressure, a second diaphragm connected to said first diaphragm for movement as a unit therewith, a spring exerting a bias force on said second diaphragm acting with said control pressure so that during said second mode said exhaust valve regulates said control pressure at a maximum pressure difference below said compressor discharge pressure proportional to the magnitude of the force exerted by said spring, an accumulator, means connecting said accumulator to said control volume so that air exhausted therefrom through said control valve is captured by said accumulator, the pressure of said captured air increasing in said accumulator at a preselected rate, and means operative to expose said second diaphragm on the side thereof opposite said spring to said increasing accumulator pressure so that the net bias force exerted by said spring on said second diaphragm and said maximum pressure difference decrease at said preselected rate and said control pressure approaches said compressor discharge pressure at said preselected rate.

4. The improvement recited in claim 3 further including an orifice of predetermined flow area connected to said accumulator operative to limit said accumulator pressure to a maximum magnitude and to discharge said accumulator when said valve for exhausting said control volume is closed.

5. The improvement recited in claim 4 further including an accumulator discharge passage connecting said accumulator and said control volume, and a check valve in said discharge passage biased to a closed position by said control pressure and to an open position by said accumulator pressure so that when said accumulator pressure exceeds said control pressure said check valve moves to said open position and said accumulator discharges into said control volume.

* * * * *